(12) United States Patent
Elson et al.

(10) Patent No.: US 11,014,428 B2
(45) Date of Patent: May 25, 2021

(54) CONTROLLING CLIMATE IN VEHICLE CABINS

(71) Applicant: Ford Global Technologies, LLC, Dearborn, MI (US)

(72) Inventors: John Elson, Farmington Hills, MI (US); Daniel Boccuccia, San Francisco, CA (US); Victoria Schein, Dearborn, MI (US); Clay Maranville, Ypsilanti, MI (US); Mitali Chakrabarti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

(21) Appl. No.: 16/109,393

(22) Filed: Aug. 22, 2018

(65) Prior Publication Data
US 2020/0062076 A1 Feb. 27, 2020

(51) Int. Cl.
*B60H 1/00* (2006.01)

(52) U.S. Cl.
CPC ..... *B60H 1/00657* (2013.01); *B60H 1/00735* (2013.01); *B60H 1/00742* (2013.01); *B60H 1/00971* (2013.01); *B60H 2001/00733* (2019.05)

(58) Field of Classification Search
CPC ............ B60H 1/00657; B60H 1/00735; B60H 1/00742; B60H 1/00971; B60H 2001/0015; B60H 2001/00733
USPC ................................................ 165/203, 205
See application file for complete search history.

(56) References Cited

U.S. PATENT DOCUMENTS

| 5,806,046 | A | 9/1998 | Curran et al. |
| 6,651,895 | B1 | 11/2003 | Kadle et al. |
| 9,092,309 | B2 * | 7/2015 | MacNeille ............... G06F 17/00 |
| 9,524,514 | B2 | 12/2016 | MacNeille et al. |
| 2008/0306656 | A1 * | 12/2008 | Baumann .......... B60R 21/01552 701/45 |
| 2014/0180764 | A1 | 6/2014 | Lehmann |

(Continued)

FOREIGN PATENT DOCUMENTS

WO  2007/065736 A1  6/2007

OTHER PUBLICATIONS

Han, et al. "A Sensitivity Study of Occupant Thermal Comfort in a Cabin Using Virtual Thermal Comfort Engineering," SAE 2005 World Congress & Exhibition, SAE Technical Paper, 2005 (Abstract).

*Primary Examiner* — Len Tran
*Assistant Examiner* — Gustavo A Hincapie Serna
(74) *Attorney, Agent, or Firm* — Brandon Hicks; Eversheds Sutherland (US) LLP

(57) ABSTRACT

The present disclosure extends to methods, systems, and computer program products for controlling climate in vehicle cabins. A person may provide climate related data to a vehicle climate control system prior to pick up and/or during a ride in the vehicle. The climate control system may adjust the climate in at least part of a vehicle cabin based at least in part on the climate related data and configuration of components in the climate control system. Climate control adjustments can be used to precondition part of a vehicle cabin for a person and/or in response to indicated thermal discomfort of the person. The climate control system can refer to an occupant comfort model and compute climate adjustments in accordance with the occupant comfort model.

19 Claims, 12 Drawing Sheets

(56) References Cited

U.S. PATENT DOCUMENTS

| | | | |
|---|---|---|---|
| 2014/0200765 A1* | 7/2014 | Waeller | B60W 50/0098 |
| | | | 701/36 |
| 2015/0081169 A1* | 3/2015 | Pisz | B60H 1/00657 |
| | | | 701/36 |
| 2015/0127215 A1* | 5/2015 | Chatterjee | B60R 16/037 |
| | | | 701/36 |
| 2017/0158023 A1 | 6/2017 | Stevanovic et al. | |
| 2017/0174159 A1* | 6/2017 | Steinam | B60H 1/00657 |
| 2017/0368905 A1* | 12/2017 | Li | B60H 1/00778 |
| 2018/0222414 A1* | 8/2018 | Ihlenburg | B60H 1/00657 |
| 2019/0084372 A1* | 3/2019 | Gallagher | A61B 5/0077 |
| 2019/0085810 A1* | 3/2019 | Oomi | G08C 17/02 |
| 2019/0090097 A1* | 3/2019 | Burdette | H04W 4/30 |
| 2019/0126721 A1* | 5/2019 | Salter | B60H 1/00742 |
| 2019/0126934 A1* | 5/2019 | Wellborn | H04W 4/44 |
| 2019/0141023 A1* | 5/2019 | Miramonti | H04W 12/04 |
| 2019/0149611 A1* | 5/2019 | Mueller | B60N 2/002 |
| | | | 455/456.1 |
| 2019/0149612 A1* | 5/2019 | Mueller | H04L 67/125 |
| | | | 455/456.1 |
| 2019/0176624 A1* | 6/2019 | Powell | B60H 1/00657 |
| 2019/0184788 A1* | 6/2019 | Stachewicz | B60H 1/00657 |
| 2019/0351741 A1* | 11/2019 | Dongo | B60H 1/2218 |

\* cited by examiner

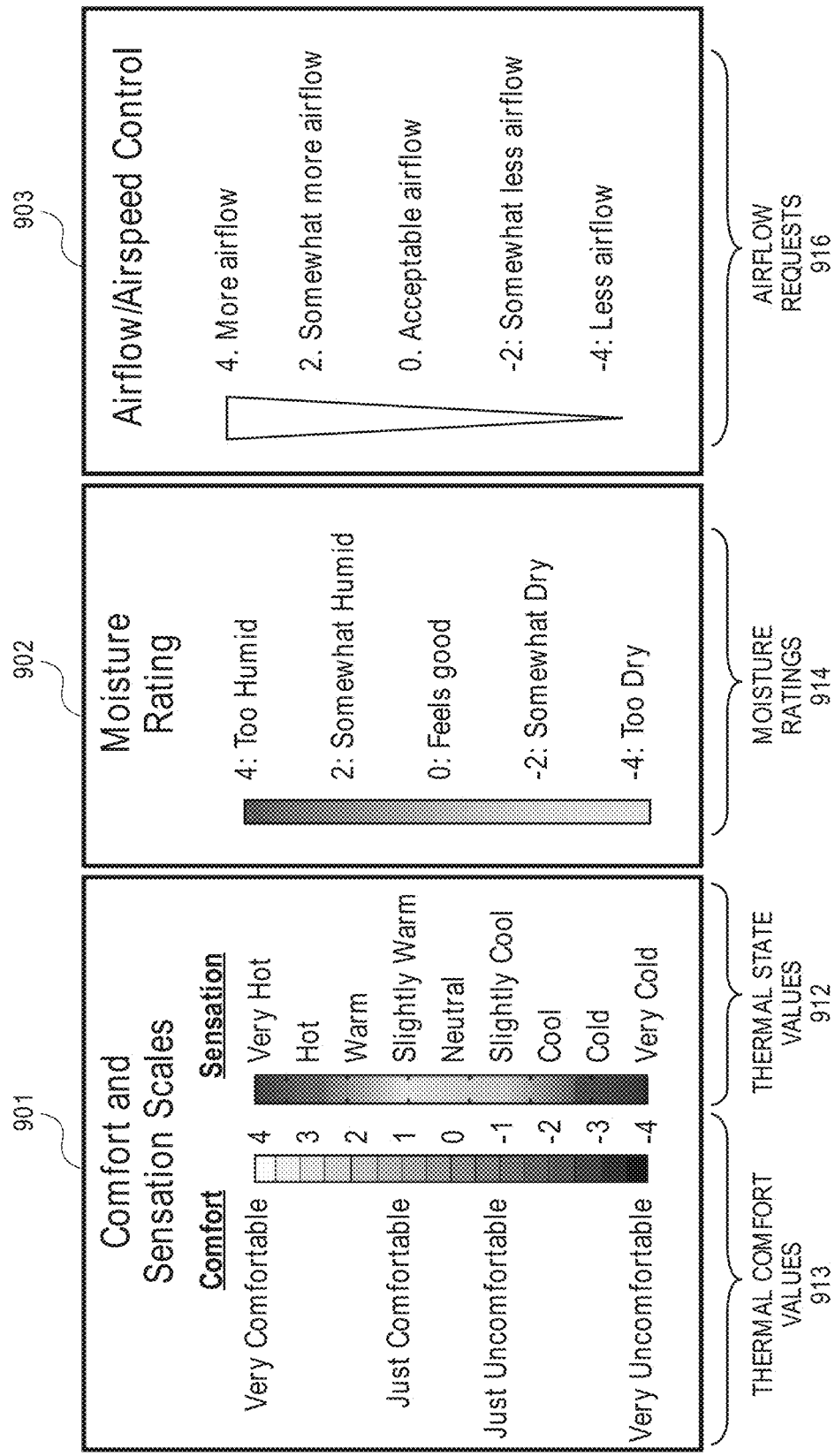

CONTROLLING CLIMATE IN VEHICLE CABINS

BACKGROUND

1. Technical Field

This disclosure relates generally to the field of climate control, and, more particularly, to controlling climate in vehicle cabins.

2. Background

Passengers in ride share vehicles can be thermally uncomfortable in different parts of a vehicle during rides. However, passengers are often unwilling to voice their discomfort to the driver who has control over the climate control system or there may be no driver. In some vehicles, thermal stratification throughout a cabin can cause thermal discomfort. However, thermal stratification may not be identified without user feedback and/or vehicle sensors.

Occupants can experience different thermal conditions as a result of their clothing. Different occupants can wear different clothing ensembles (e.g., one person in a suit and another person in shorts, t-shirt, and sandals, etc.). When occupants feel uncomfortable, it can be difficult for the occupants to change clothing if seated and fastened into the vehicle. Occupants may voice their displeasure to the driver and risk being the only person that feels uncomfortable or may desire some way to indicate discomfort to an autonomous vehicle.

BRIEF DESCRIPTION OF THE DRAWINGS

The specific features, aspects and advantages of the present disclosure will become better understood with regard to the following description and accompanying drawings where:

FIGS. 9A-9D illustrate example user interface screens having relatively more granular user interface controls than those illustrated in FIGS. 8A and 8B.

DETAILED DESCRIPTION

Figure 1:
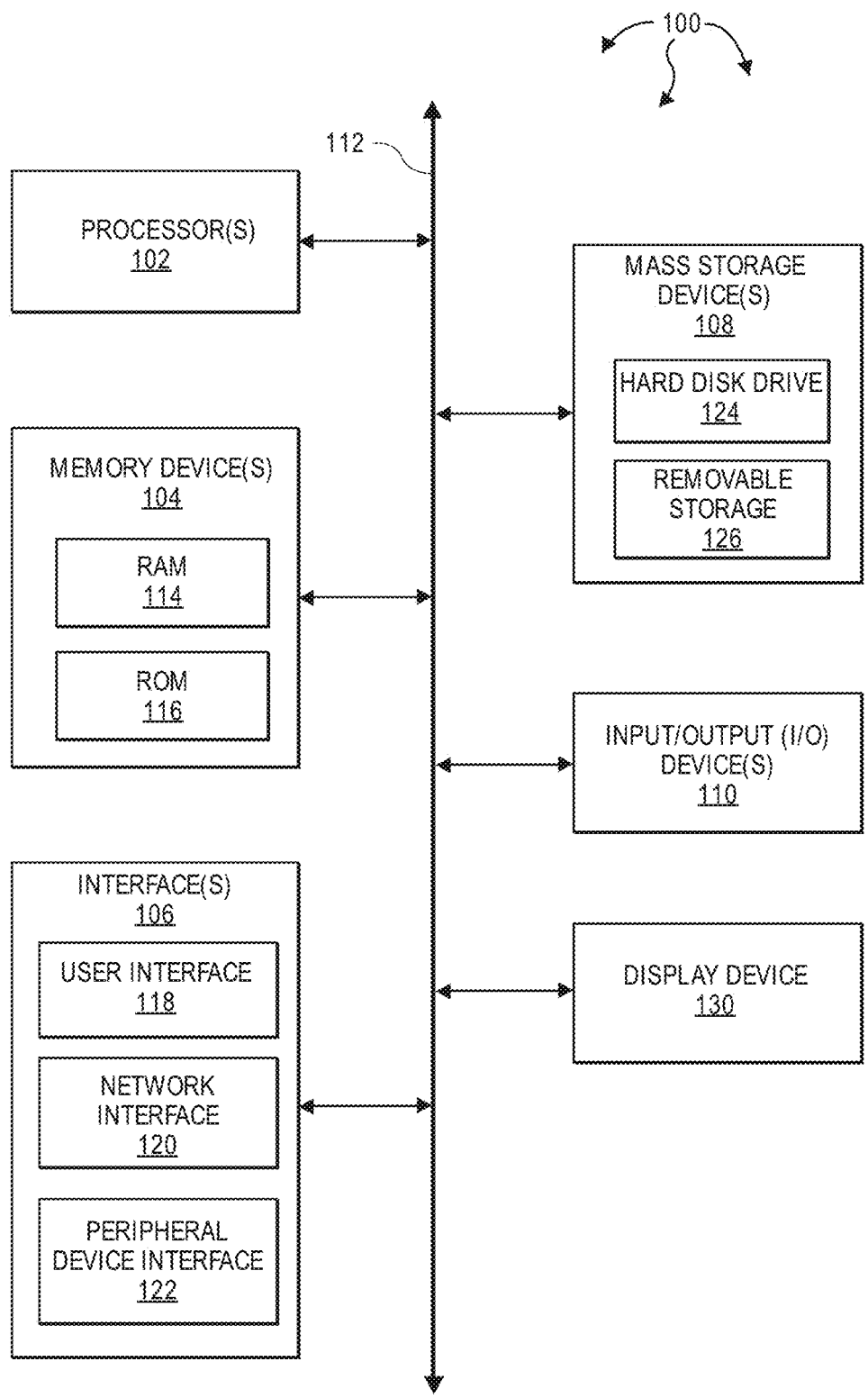
FIG. 1 illustrates an example block diagram of a computing device.

The present disclosure extends to methods, systems, and computer program products for controlling climate in vehicle cabins.

Automated climate control systems, such as, for example, Electronic Automatic Temperature Control (EATC), utilize user/occupant feedback to control climate in vehicle cabins. A mobile device includes an application to receive user/occupant feedback. The mobile device sends the user/occupant feedback to a climate control system controller. The climate control system controller may be one or more computer processors coupled to memory at the vehicle. The memory may store computer-executable instructions that, when executed by the one or more computer processors be configured to adjust individual climate control system components of the vehicle. For example, the controller may be configured to direct registers (including aiming, airflow velocity, air flow direction, temperature, etc.), fans, radiant heaters, heated surfaces (e.g., seats, armrests, etc.), air conditioners, humidifiers, etc. to perform certain actions. Alternately, the application can notify/provide instructions to a driver and/or a front seat passenger to change manual Heating, Ventilation, and Air Conditioning (HVAC) controls. The application can store user/occupant presets for future trips or interactions with a climate control system.

A user/occupant can enter inputs into the application through a user interface at their mobile device (e.g., phone, tablet, integrated, etc.). An automated climate control system can respond to user input to adjust the climate in at least part of a vehicle cabin. For manual systems, notifications/instructions are provided to a driver and/or a front seat passenger without identifying the passenger requesting a climate change. In one aspect, a passenger enters information indicating his or her thermal comfort, for example, if he or she is too hot or too cold. A climate control system automatically adjusts climate control system components to address any discomfort.

A passenger can indicate his or her presence to a climate control system in a variety of ways. In one aspect, a passenger enters a seat number into the application. In another aspect, a mobile device is automatically detected via Bluetooth or Wi-Fi. In a further aspect, an occupant uses a mobile device to scan a QR code on a seat. In an additional aspect, an occupant uses a mobile device for a Near Field Communication (NFC) tap to a seat. In another aspect, an occupant connects a mobile device to a Universal Serial Bus (USB) power source for charging. The climate control system recognizes a power draw on the USB port. In an additional other aspect, the climate control system recognizes a person via facial recognition with a visual or IR sensor. In an additional further aspect, the climate control system recognizes a person through an occupant classification system.

A user can provide input before and/or upon entering a vehicle to establish a baseline control value. If a user provides permission, the climate control system links to connected devices, such as, a mobile phone, fitness monitor, laptop, etc. The climate control system can use data monitored by any connected devices, for example, heart rate, as an indication of comfort or discomfort.

A thermo-physical model and/or comfort model can be used to calculate comfort of an occupant and compute climate control changes (e.g., change blower speed (air velocity), change blower direction (air flow direction), change temperature, lower a shade, change humidity, etc.) to improve customer experience.

An application can include user interfaces having user interface controls of varied levels of granularity so occupants can better customize their preferences.

In a basic (relatively less granular) user interface, users/occupants are provided with an application function that can be accessed when hailing a vehicle and inside a vehicle. The vehicle can query the user/occupant about thermal state (too hot, too cold, neutral, etc.) before they enter the vehicle. Based on user/occupant response(s) to the query, a climate control system controller at the vehicle can select a seat matching his or her thermal state and/or can precondition at least part of a cabin to increase the thermal comfort of the user/occupant.

In an advanced (relatively more granular) user interface, thermal comfort is separated from thermal state (the feeling of hot and cold). Thus, an occupant can indicate that they are cold or hot and comfortable. On the other hand, an occupant can indicate that they are cold or hot and uncomfortable.

In one aspect, a(n) (even more granular) user interface includes individual controls for different types of climate related data, including comfort, sensation, moisture, air quality, etc. The user interface can also allow an occupant to indicate their approximate clothing and report odors.

FIG. 1 illustrates an example block diagram of a computing device 100. Computing device 100 can be used to perform various operations, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122. In one aspect, user interface 118 includes a voice interface, for example, to receive voice commands from a human.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

A vehicle can be a land-based vehicle, a marine-based vehicle, or a vehicle capable of flight. A land based vehicle can be a car, a van, a truck, a bus, etc. A land-based vehicle can include various components, such as, for example, tires, wheels, brakes, throttle, engine, steering wheel, etc., to facilitate operation on roadways.

A vehicle capable of flight can be an airplane, helicopter, airborne taxi, etc. A vehicle capable of flight can include various components, such as, for example, tires, wheels, brakes, throttle, engine, wings, propellers, rotors, etc., to facilitate operation in the air.

A marine-based vehicle can be a boat, ship, etc. A marine-based vehicle can include various components, such as, for example, throttle, engine, propellers, rudder, etc., to facilitate operation on waterways.

A vehicle can be autonomous and/or human operated.

A vehicle can also include a climate control system for controlling the climate in vehicle cabins. Controlling the climate in vehicle cabins can include controlling one or more of: heating, cooling, ventilation, air filtration, air purification, air distribution, air perfuming, etc. A climate control system can include various components, such as, for example, one or more fans, one or more vents, a compressor, a drier/receiver, a condenser, an evaporator, an air conditioner, a thermoelectric cooler, a heater core, one or more flaps and/or one or more doors for regulating an evaporator and/or regulating a heater core, a thermostat, input controls (e.g., manual and/or automated), heating elements (e.g., embedded in a seat, armrest, steering wheel, etc.), one or more shades, one or more air filters, a fragrance reservoir, etc.

In one aspect, a vehicle cabin is separated into zones. Different subsets of climate control components in climate control system can individually control the climate in each zone. For example, each zone can have different temperature input controls, a different fan, and different vents.

Figure 2A:
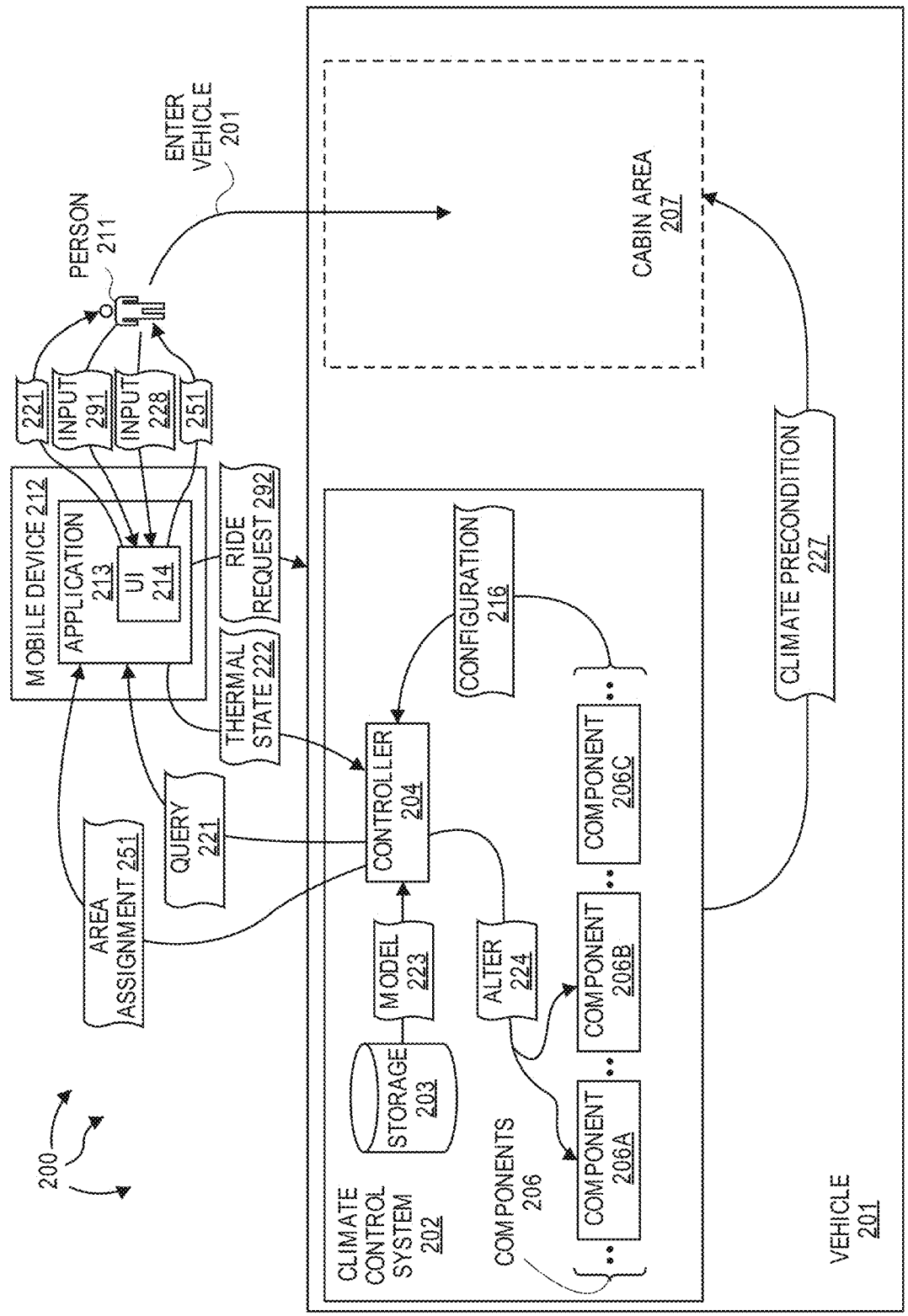
FIGS. 2A and 2B illustrate an example computer architecture that facilitates controlling the climate in vehicle cabins.
Figure 2B:
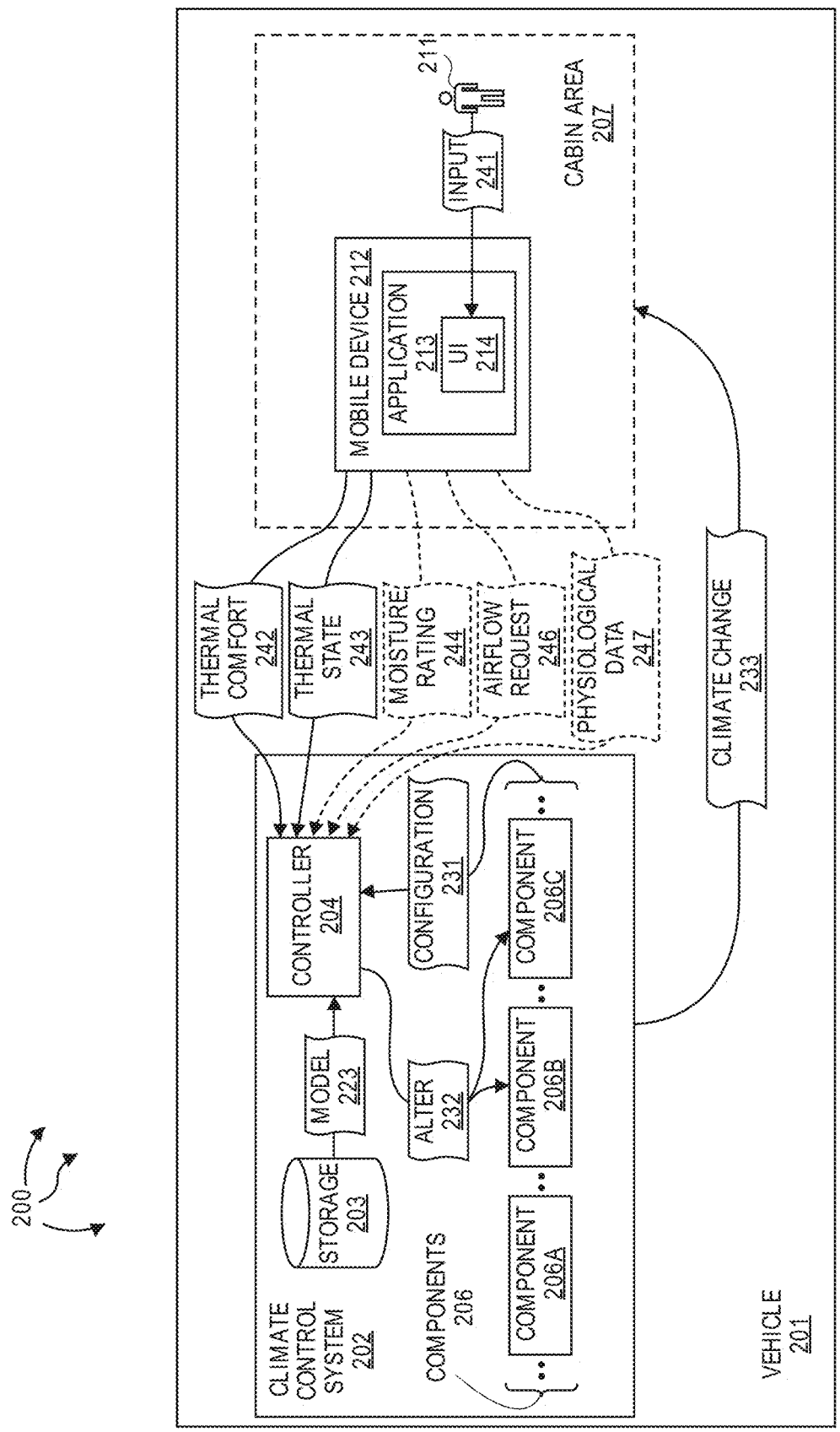

FIGS. 2A and 2B illustrates an example computer architecture 200 that facilitates controlling the climate in vehicle cabins.

As depicted, computer architecture 200 includes vehicle 201 and mobile device 212. Vehicle 201 and mobile device 212, as well as their respective components can be connected to one another over (or be part of) a network, such as, for example, a PAN, a LAN, a WAN, a controller area network (CAN) bus, and even the Internet. Accordingly, each of vehicle 201 and mobile device 212, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Vehicle 201 includes climate control system 202 for controlling the climate in cabin area 207. Cabin area 207 can be the back seat of a car, a section of seats in a bus or van, etc. Climate control system 202 includes storage 203, controller 204, and components 206. Storage 203, controller 204, and components 206 can be connected to one another (or be part of) a network, such as, a controller area network (CAN) bus within vehicle 201. Components 206 includes component 206A, component 206B, component 206C, etc., which can be any of the described climate control system components.

In one aspect, vehicle 201 travels (e.g., through human control or autonomous operation) to the location of a mobile device (or another indicated location) to pick up a person. In transit, controller 204 can query the mobile device for thermal state of the person (e.g., is the person hot, cold, etc.). In response to the query, controller 204 can receive back a thermal state of the person. The thermal state can be represented as a value ranging very cold to very hot. In one aspect, vehicle 201 is hailed from a ride share application at the mobile device.

In another aspect, a person indicates to controller 204 that he or she is in transit to the location of vehicle 201 (e.g., which may be their personal vehicle). Prior to the person arriving at vehicle 201, controller 204 can query a mobile device of the person for his or her thermal state. In response to the query, controller 204 can receive back a thermal state of the person.

Controller 204 can use the thermal state along with a current configuration of components 206 to precondition cabin area 207 for the person. Controller 204 can also indicate to the mobile device that the person is assigned to ride in cabin area 207.

In one aspect, controller 204 is connected to one or more sensors, for example, in cabin area 207 and/or on an external surface of vehicle 201. The one or more sensors can measure climate aspects, such as, for example, ambient temperature, temperature in vehicle 201 (e.g., in cabin area 207 and/or in other areas/zones), and humidity in vehicle 201. Controller 204 can account for the measured climate aspects when preconditioning cabin area 207 for the person.

Mobile device 212 (e.g., a mobile phone, laptop, etc.) can include a ride hailing or individual vehicle application 213. Application 213 includes user interface 214 (e.g., a graphical user interface). Person 211 can interact with controls of user interface 214 to request a ride, for example, from a ride share service or request a pickup from his or her own autonomous vehicle. In another aspect, person 211 interacts with controls of user interface 214 to prestart his or her vehicle and precondition the environment in the cabin of the vehicle.

Person 211 can also interact with controls of user interface 214 to indicate a thermal state of person 211 to a vehicle. Thermal state can be indicated to a vehicle when the vehicle 201 is in transit to pick up person 211 (either a ride share vehicle or autonomous vehicle valet) or when person 211 is in transit to vehicle 201. Thermal state can also be indicated to a vehicle prior to transit. For example, person 211 can indicate his or her thermal state to his or her vehicle prior to initiating vehicle travel.

Figure 3:
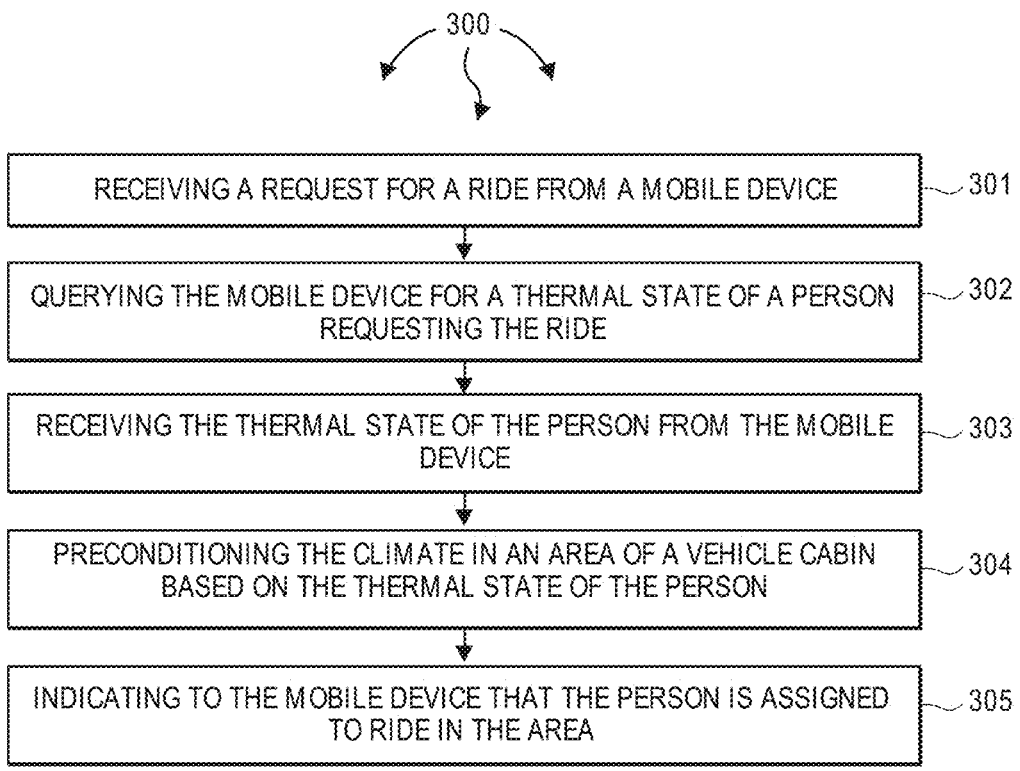
FIG. 3 illustrates a flow chart of an example method for controlling the climate in vehicle cabins prior to entering a vehicle.

FIG. 3 illustrates a flow chart of an example method 300 for controlling the climate in vehicle cabins prior to entering a vehicle. Method 300 will be described with respect to the components and data of environment 200.

Method 300 includes receiving a request from a mobile device that a person is desirous to ride in a vehicle (301). For example, person 211 can enter input 291 at user interface 214 of a mobile device to request a pickup. From input 291, application 213 can formulate request 292 (e.g., a pickup request). In one aspect, a ride share service routes request 292 (a ride request) to vehicle 201. In another aspect, application 213 sends request 292 directly to person 211's personal vehicle 201. Vehicle 201 can receive request 292 Vehicle 201 can possibly initiate travel to the location of mobile device 212 (and thus to person 211) for a pickup.

Method 300 includes querying the mobile device for a thermal state of the person (302). For example, in transit to the location of mobile device 212, controller 204 can send thermal state query 221 to application 213. Application 213 can present thermal state query 221 to person 211 at user interface 214. Person 211 can enter input 228 indicative of thermal state 222 (e.g., hot, cold, etc.) at user interface 214. Application 213 can send thermal state 222 to vehicle 201. Method 300 includes receiving thermal state of the person from the mobile device (303). For example, controller 204 can receive thermal state 222 from mobile device 212.

In another example, person 211 (a vehicle owner) enters input 291 at user interface 214 to indicate to vehicle 201 (a personal vehicle, which may be a fully autonomous, partially autonomous, or non-autonomous vehicle) that he or she intends to enter the vehicle. Application 213 can formulate request 292 from input 291. Request 292 can be a request to start vehicle 201 and precondition cabin area 207 prior to travel. Mobile device 212 communicates request 292 directly to vehicle 201. Vehicle 201 can receive request 292 and controller 204 can start vehicle 201.

Controller 204 can also send thermal state query 221 to application 213. Application 213 can present thermal state query 221 to person 211 at user interface 214. Person 211 can enter input 228 indicative of thermal state 222 (e.g., hot, cold, etc.) at user interface 214. Application 213 can send thermal state 222 to vehicle 201. Controller 204 can receive thermal state 222 from mobile device 212.

Alternately, either in association with a ride request or when preparing a personal vehicle, thermal state 222 can be preset in application 213. Thermal state 222 can be sent automatically to vehicle 201 without vehicle 201 having to query.

Method 300 includes preconditioning the climate in an area of the vehicle cabin based on the thermal state of the person (304). For example, controller 204 can compute a climate change for cabin area 207 based on thermal state 222 and configuration 216 of components 206. Controller 204 can also access occupant comfort model 223 from storage 203 and compute the climate change in accordance with occupant comfort module 223. In one aspect, occupant comfort model 223 is thermo-physiological model that models the physiological response of humans to environmental conditions. The thermo-physiological model can be based on any of a number of thermo-physiological models including the U.C. Berkley model, the Fiala model, the American Society of Heating, Refrigerating and Air-Conditioning Engineers (ASHRAE) Predicted Mean Vote (PMV) model, etc. In other aspects, an occupant comfort module 223 is a control algorithm, a lookup table, or some other comfort model.

Controller 204 can alter 224 components 206A and 206B to implement the computed climate change as climate precondition 227 at cabin area 207. For example, if thermal state 222 indicates that person 211 is cold, climate precondition 227 can warm up (e.g., increase temperature of air blowing into) cabin area 207 prior to picking up person 211. On the other hand, if thermal state 222 indicates that person 211 is hot, climate precondition 227 can cool off (e.g., decrease temperature of air blowing into) cabin area 207 prior to picking up person 211.

Method 300 includes indicating to the mobile device that the person is assigned to ride in the area (305). For example, controller 204 can send area assignment 251 to mobile device 212. Assignment 251 indicates that person 211 is assigned to ride in cabin area 207. Application 213 can present area assignment 251 to person 211 at user interface 214. Thus, when vehicle 201 arrives at the location of mobile device 212, person 211 can enter vehicle 201 and move to cabin area 207. Since the climate of cabin area 207 is preconditioned, person 211 can experience increased comfort upon entering cabin area 207. For example, if person 211 is coming from the gym, controller 211 can precondition cabin area 207 to be relatively cooler.

In one aspect, controller 204 also obtains weather data at the location of mobile device 212, either from mobile device 212 or through reference to an external service. Controller 204 considers the weather data when preconditioning cabin area 207. For example, if person 211 is standing outside in the cold, controller 211 can precondition cabin area 207 with increased warmth.

However, after some amount of time in cabin area 207, person 211 may become thermally uncomfortable (e.g., too hot or too cold). FIG. 2B depicts person 211 in cabin area 207. Mobile device 212 can indicate presence of person 211 in cabin area 207. In one aspect, passenger 211 enters a seat number at user interface 214 and application 213 forwards the seat number to controller 204. In another aspect, controller 204 detects mobile device 212 through Bluetooth or Wi-Fi signals. In a further aspect, person 211 uses mobile device 212 to scan a QR code on a seat and application 213 sends data associated with the QR code to controller 204. In an additional aspect, person 211 uses mobile device 212 for an Near Field Communication (NFC) tap to a seat and mobile device 212 is detected at controller 204 via an in-vehicle controller area network (CAN). In a further other aspect, person 211 plugs mobile device 212 into a USB power source for charging. Controller 204 recognizes a power draw on the USB port via an in-vehicle controller area network (CAN). In an additional other aspect, controller 204 recognizes person 211 via facial recognition with a visual or IR sensor. In an additional further aspect, controller recognizes person 211 through an occupant classification system.

In one aspect, person 211 indicates thermal state and/or thermal comfort to controller 204. Thermal state can be represented as a value ranging very cold to very warm. Thermal comfort can be represented as a value ranging from very comfortable to very uncomfortable. Use of thermal state and thermal comfort allows controller 204 to implement more relevant climate changes in cabin area 207. For example, controller 204 may implement a different climate change (or no climate change at all) if a person indicates he or she is cold (thermal state) and comfortable (thermal comfort) versus the person indicating he or she is cold (thermal state). Similarly, controller 204 may implement a different climate change (or no climate change at all) if a person indicates he or she is neutral (thermal state) and uncomfortable (thermal comfort) versus the person indicating he or she is neutral (thermal state).

Figure 4:
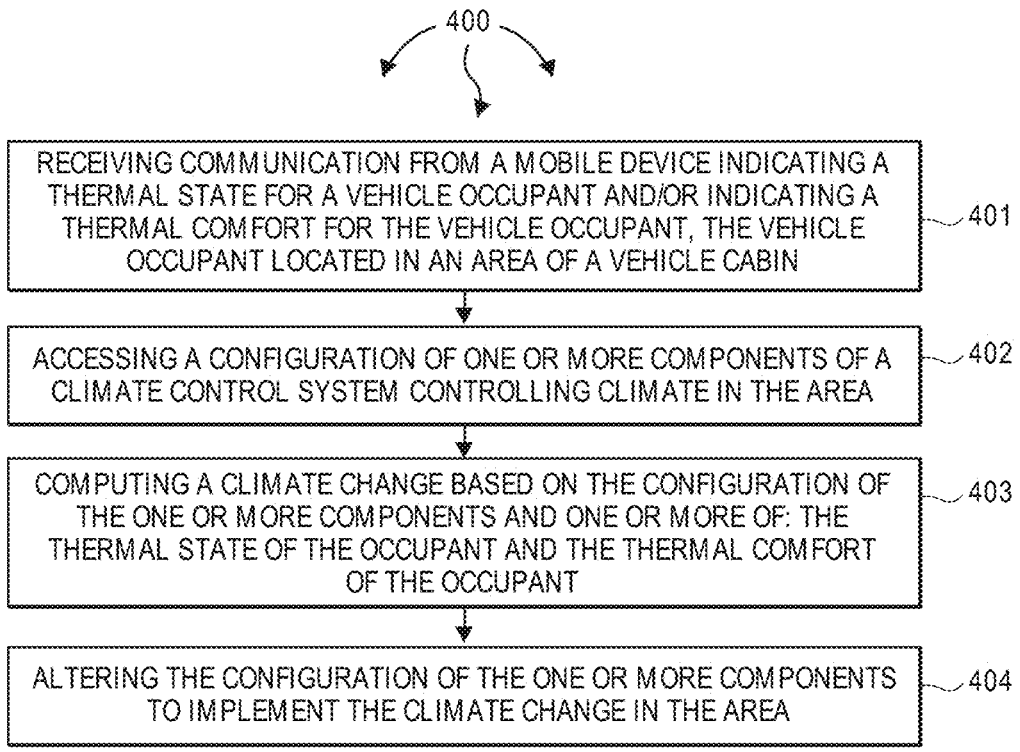
FIG. 4 illustrates a flow chart of an example method for controlling the climate in vehicle cabins from within the vehicle cabin.

FIG. 4 illustrates a flow chart of an example method 400 for controlling the climate in vehicle cabins from within the vehicle cabin. Method 400 will be described with respect to the components and data of environment 200 of FIGS. 2A and 2B.

User interface 214 can include user interface controls for indicating thermal state and/or thermal comfort. Person 211 can interact with the user interface controls to enter input 241 indicating thermal state 243 and/or thermal comfort 242. Thermal state 243 can be a value indicating the thermal state of person 211 in a range from very cold to very hot. Thermal comfort 232 can be a value indicating the thermal comfort of person 211 in a range from very comfortable to very uncomfortable. Application 213 can send thermal state 243 and/or thermal comfort 242 to controller 204.

Method 400 includes receiving communication from a mobile device indicating a thermal state for a vehicle occupant and/or indicating a thermal comfort for the vehicle occupant, the vehicle occupant located in an area of a vehicle cabin (401). For example, controller 204 can receive thermal state 243 and/or thermal comfort 242 from application 213.

Method 400 includes accessing a configuration of one or more components of a climate control system controlling climate in the area (402). For example, controller 204 can access configuration 231 of one or more of components 206 controlling the climate in cabin area 207.

Method 400 includes computing a climate change based on the configuration of one or more components and one or more of: the thermal state of the occupant and the thermal comfort of the occupant (403). For example, controller 204 can formulate climate change 233 based on configuration 231 and one or more of: thermal state 243 and thermal comfort 242.

Method 400 includes altering the configuration of the one or more components to implement the climate change in the area (404). For example, controller 204 can alter 232 the configuration of component 206B and of component 206C to implement climate change 233 in cabin area 207. Component 206B and component 206C can be any of the described climate control system components. For example, component 206B may be a fan that is adjusted to reduce the rate or increase the rate of blowing air into cabin area 207. Component 206C may be a heater core valve that is adjusted to increase or decrease the temperature of air blown into cabin area 207.

In one aspect, controller 204 also accesses thermo-physiological model 223 from storage 203 and computes climate change 233 in accordance with thermo-physiological model 223.

User interface 214 can also include user interface controls for indicating other climate related settings to controller 204. For example, user interface 214 can include a user interface control for indicating a moisture rating. A moisture rating can be represented as a value ranging from too humid to too dry. User interface 214 may include a user interface control for requesting an airflow change. An airflow change request can be represented as a value ranging from more airflow to less airflow. User interface 214 can also include user interface controls for other climate related settings, including air quality, providing climate change feedback (e.g., did a climate change increase comfort), etc.

In one aspect, controller 204 links to one or more connected devices in cabin area 207. Linked devices can send physiological data (e.g., heart rate), calendar data (e.g., did person 211 just finish working out at the gym), user preferences, etc. to controller 204.

Thus, it may be that mobile device 212 (and/or another connected device) sends one or more of moisture rating 244, airflow request 246, or physiological data 247 to controller 204. Controller 204 can consider any of moisture rating 244, airflow request 246, physiological data 247, as well as other climate related data when computing climate change 233.

In one aspect, multiple occupants can be riding in the same area of a vehicle. Thermal state, thermal comfort, and other climate related data from the multiple occupants can be considered when computing a climate change.

Figure 5:
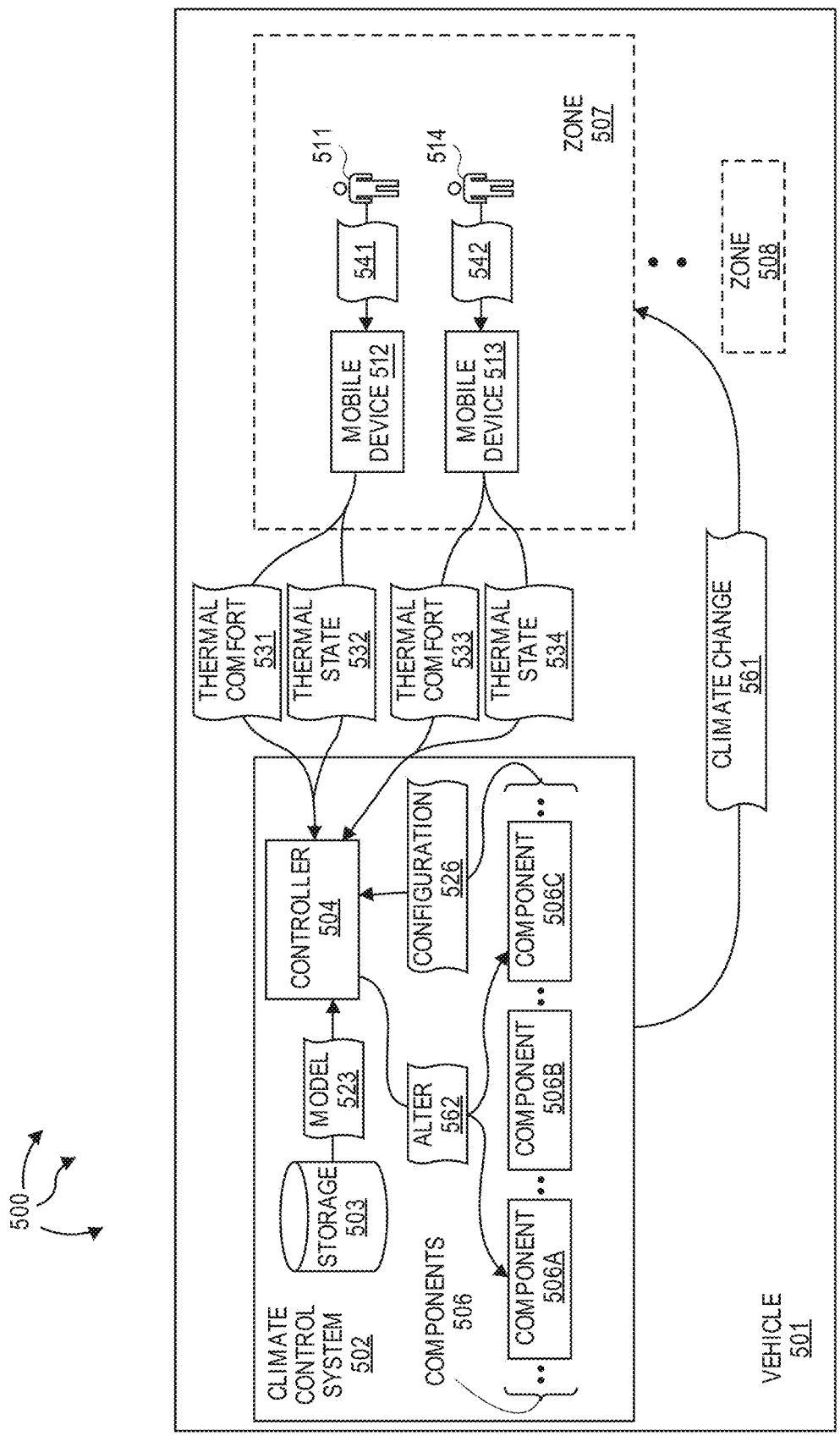
FIG. 5 illustrates an example computer architecture that facilitates controlling the climate for multiple passengers in the same zone of a vehicle cabin.

FIG. 5 illustrates an example computer architecture 500 that facilitates controlling the climate for multiple passengers in the same zone of a vehicle cabin.

As depicted, vehicle 501 includes climate control system 502. Climate control system 502 controls the climate in multiple zones of vehicle 501, including zones 507 and 508. Climate control system 502 includes storage 503, controller 504, and components 506. Components 506 includes components 506A, 506B, 506C, etc. Components 506A, 506B, 506C, etc. can be any of the described climate control system components. Storage 503, controller 504, and components 506 can be connected to one another (or be part of) a network, such as, a controller area network (CAN) bus within vehicle 501. In one aspect, vehicle 501 is a bus, an aircraft, or a train.

Occupants 511 and 514 are both riding in zone 507. Occupant 511 can interact with user interface controls at mobile device 512 to enter input 541. Input 541 can indicate thermal state 532 and/or thermal comfort 531 (and potentially one or more other types of climate related data). Similarly, occupant 514 can interact with user interface controls at mobile device 513 to enter input 542. Input 542 can indicate thermal state 534 and/or thermal comfort 533 (and potentially one or more other types of climate related data).

Controller 504 can receive thermal state 532 and/or thermal comfort 531 (and any other types of climate related data) from mobile device 512 and can receive thermal state 534 and/or thermal comfort 533 (and any other types of climate related data) from mobile device 513. Based on configuration 526 of components 506, controller 504 balances thermal state 532 and/or thermal comfort 531 (and any other types of climate related data from occupant 511) and thermal state 534 and/or thermal comfort 533 (and any other types of climate related data from occupant 514) to compute climate change 561. Controller 504 can also access thermo-physiological model 523 (or a control algorithm, lookup table, etc.) from storage 503 and compute climate change 561 in accordance with thermo-physiological model 523 (or the control algorithm, lookup table, etc.).

Controller 504 can alter 562 the configuration of components 506A and 506C to implement climate change 561 in zone 507. Climate change 561 can represent a compromise between competing requests of occupant 511 and 514. Climate change 561 can increase the thermal comfort of occupant 511 and 514 somewhat but perhaps less than if occupant 511 or occupant 514 were the sole occupant of zone 507. Controller 504 can also balance climate changes based on climate related data associated with additional occupants of zone 507. Controller 504 can attempt to increase the comfort of as may occupants as possible.

In another aspect, occupants ride in different areas of a vehicle. For each area, the thermal state, thermal comfort, and other climate related data from occupants in the area can be considered when computing a climate change for the area.

Figure 6:
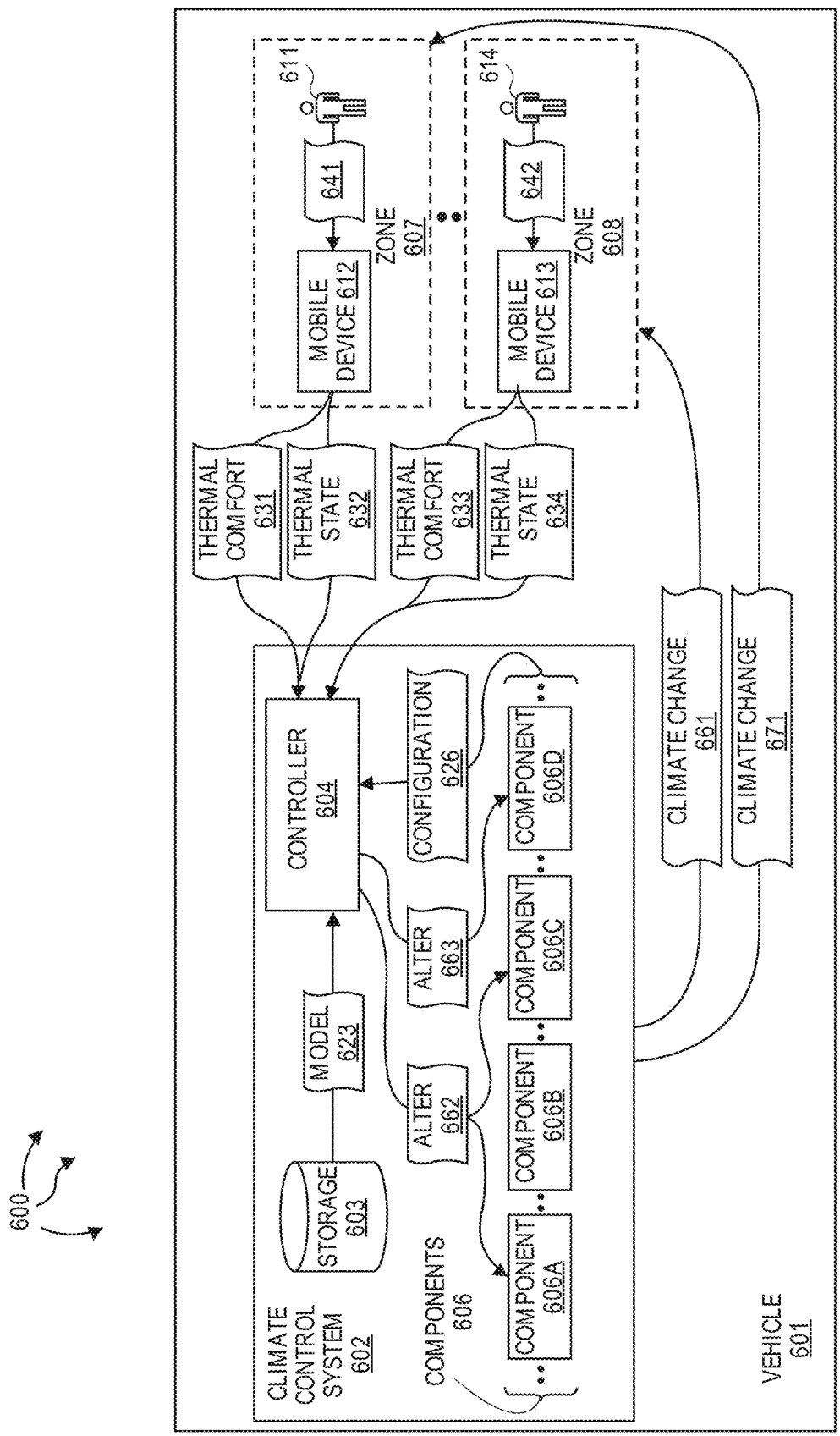
FIG. 6 illustrates an example computer architecture that facilitates controlling the climate across multiple zones of a vehicle cabin.

FIG. 6 illustrates an example computer architecture 600 that facilitates controlling the climate across multiple zones of a vehicle cabin.

As depicted, vehicle 601 includes climate control system 602. Climate control system 602 controls the climate in multiple zones of vehicle 601, including zones 607 and 608. Climate control system 602 includes storage 603, controller 604, and components 606. Components 606 includes components 606A, 606B, 606C, 606D, etc. Components 606A, 606B, 606C, 606D, etc. can be any of the described climate control system components. Storage 603, controller 604, and components 606 can be connected to one another (or be part of) a network, such as, a controller area network (CAN) bus within vehicle 601. In one aspect, vehicle 601 is a bus, an aircraft, or a train.

Occupant 611 is riding in zone 607 and occupant 614 is riding in zone 608. Occupant 611 can interact with user interface controls at mobile device 612 to enter input 641. Input 641 indicates thermal state 632 and/or thermal comfort 631 (and potentially one or more other types of climate related data) Similarly, occupant 614 can interact with user interface controls at mobile device 613 to enter input 642. Input 642 indicates thermal state 634 and/or thermal comfort 633 (and potentially one or more other types of climate related data).

Controller 604 can receive thermal state 632 and/or thermal comfort 631 (and any other types of climate related data) from mobile device 612. Based on configuration 626 of components 606, thermal state 632 and/or thermal comfort 631 (and any other types of climate related data from occupant 611), controller 604 computes climate change 671. Controller 604 can also access thermo-physiological model 623 (or the control algorithm, lookup table, etc.) from storage 603 and compute climate change 671 in accordance with thermo-physiological model 623 (or the control algorithm, lookup table, etc.). Controller 604 can alter 663 the configuration of component 606D to implement climate change 671 in zone 607.

Similarly, controller 604 can receive thermal state 634 and/or thermal comfort 633 (and any other types of climate related data) from mobile device 613. Based on the configuration 626 of components 606, thermal state 634 and/or thermal comfort 633 (and any other types of climate related data from occupant 614), controller 604 computes climate change 661. Controller 604 can also access thermo-physiological model 623 (or a control algorithm, lookup table, etc.) from storage 603 and compute climate change 661 in accordance with thermo-physiological model 623 (or the control algorithm, lookup table, etc.). Controller 604 can alter 662 the configuration of components 606A and 606C to implement climate change 661 in zone 608.

In one aspect, a ride share application includes different user interface controls that can be used to specify climate control data with varied granularity. Less granular user interface controls can be used to indicate thermal state. More granular user interface controls can be used to indicate thermal state and thermal comfort. Even more granular user interface controls can be used to indicate thermal state, indicate thermal comfort, indicate a moisture rating, request a change in airflow, indicate unpleasant air quality, indicate that a prior climate change was unsatisfactory, and provide clothing input.

Figure 7A:
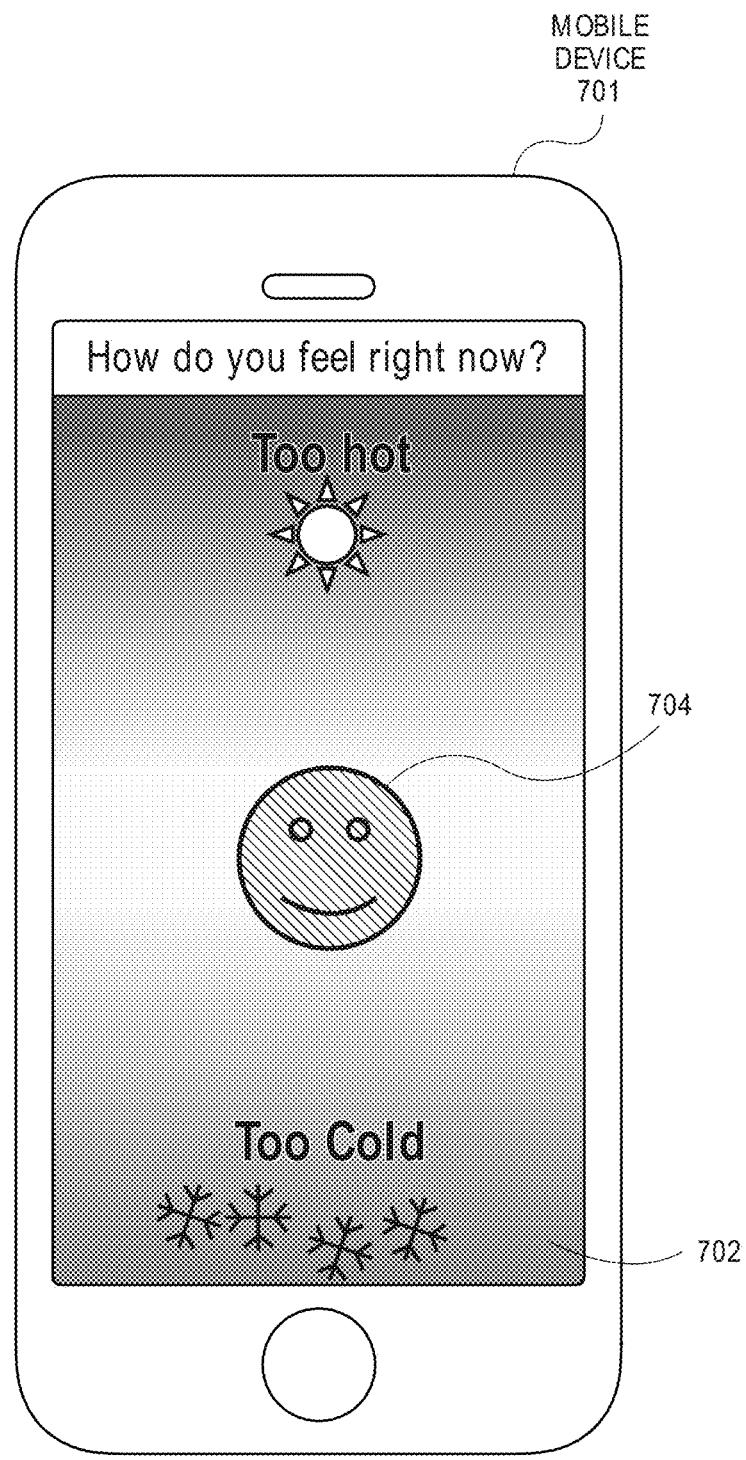
FIGS. 7A and 7B illustrate example user interface screens having relatively less granular user interface controls than those illustrated in FIGS. 8A and 8B.
Figure 7B:
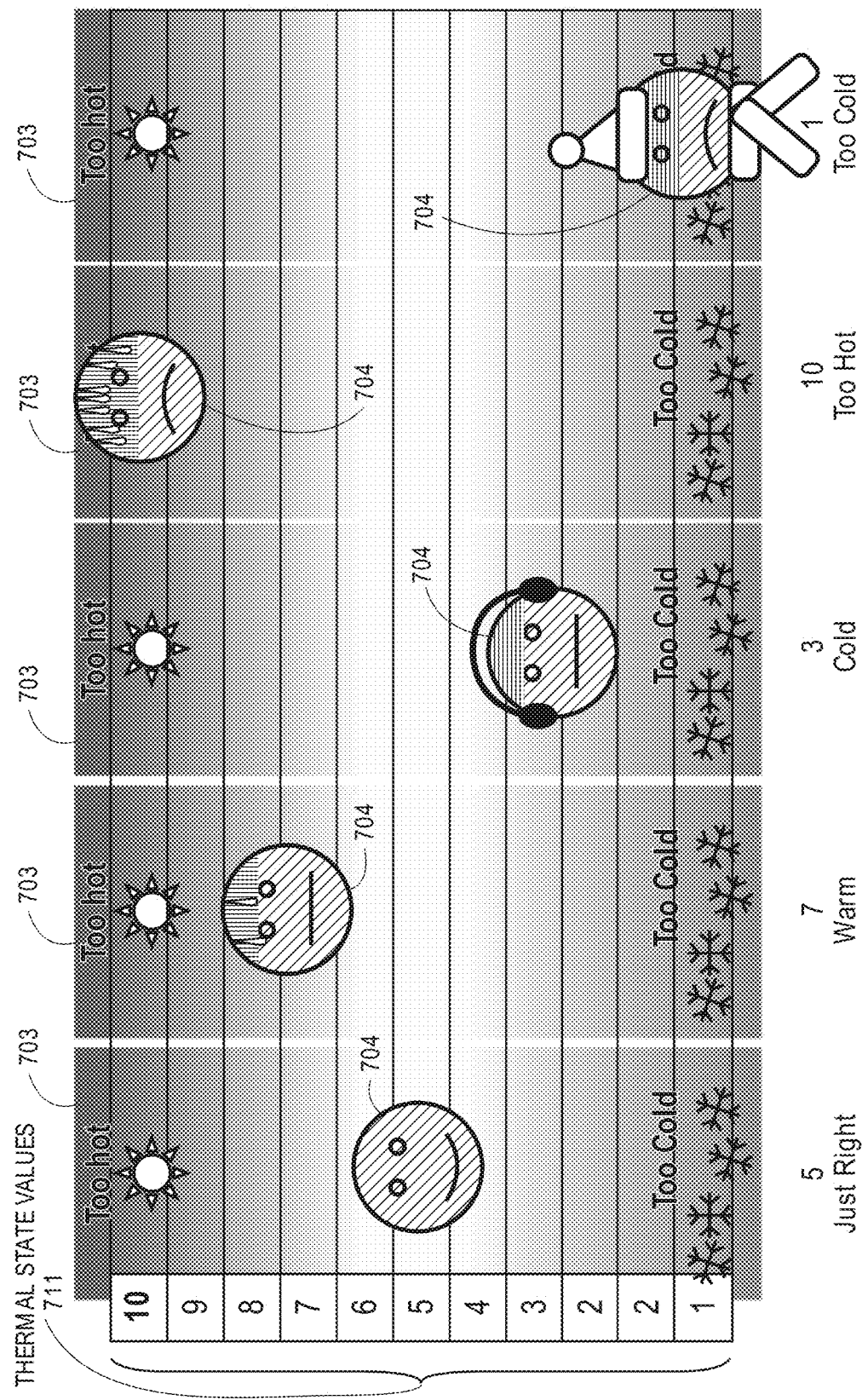

FIGS. 7A and 7B illustrate example user interface screens having less granular user interface controls. As depicted, mobile device 701 include user interface screen 702. A user can move icon 704 in one dimension (up/down) on user interface screen 702. For example, the user can move (drag) icon 704 up to indicate a thermal state of increasing warmth and can move (drag) icon 704 down to indicate a thermal state of increasing coolness. Different instances of user interface screen 703 depict a range of thermal state values 711 from 1 (too cold) to 10 (too hot). Mobile device 701 can render icon 704 to match an indicated thermal state (e.g., "just right", "warm", "cold", "too hot", "too cold", etc.) as icon 704 is moved. Mobile device 701 can send a thermal state selected through user interface screen 702 and/or through user interface screen 703 to a climate control system controller (e.g., 204, 504, 604, etc.).

Figure 8A:
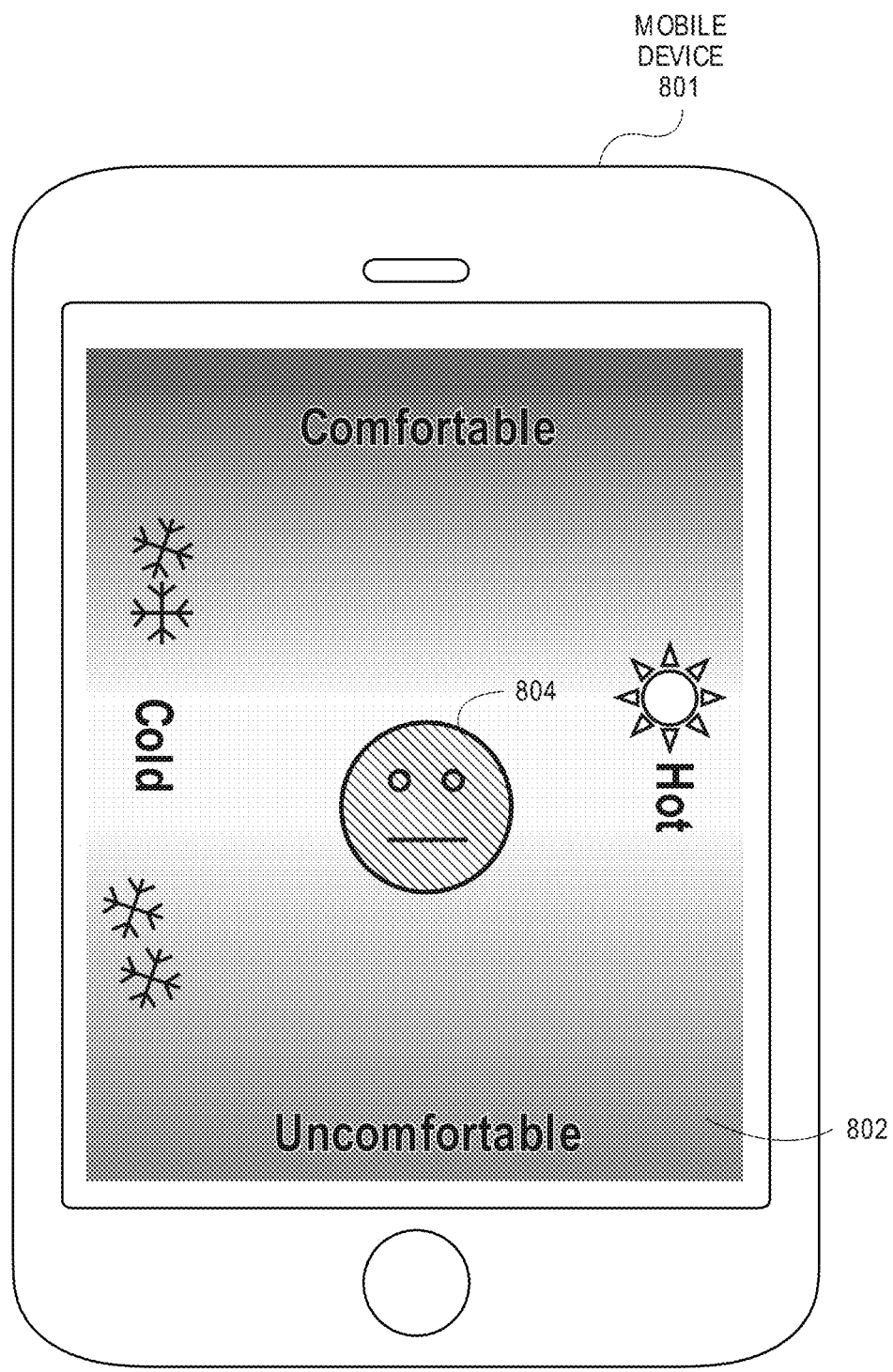
FIGS. 8A and 8B illustrate example user interface screens having relatively more granular user interface controls than those illustrated in FIGS. 7A and 7B.
Figure 8B:
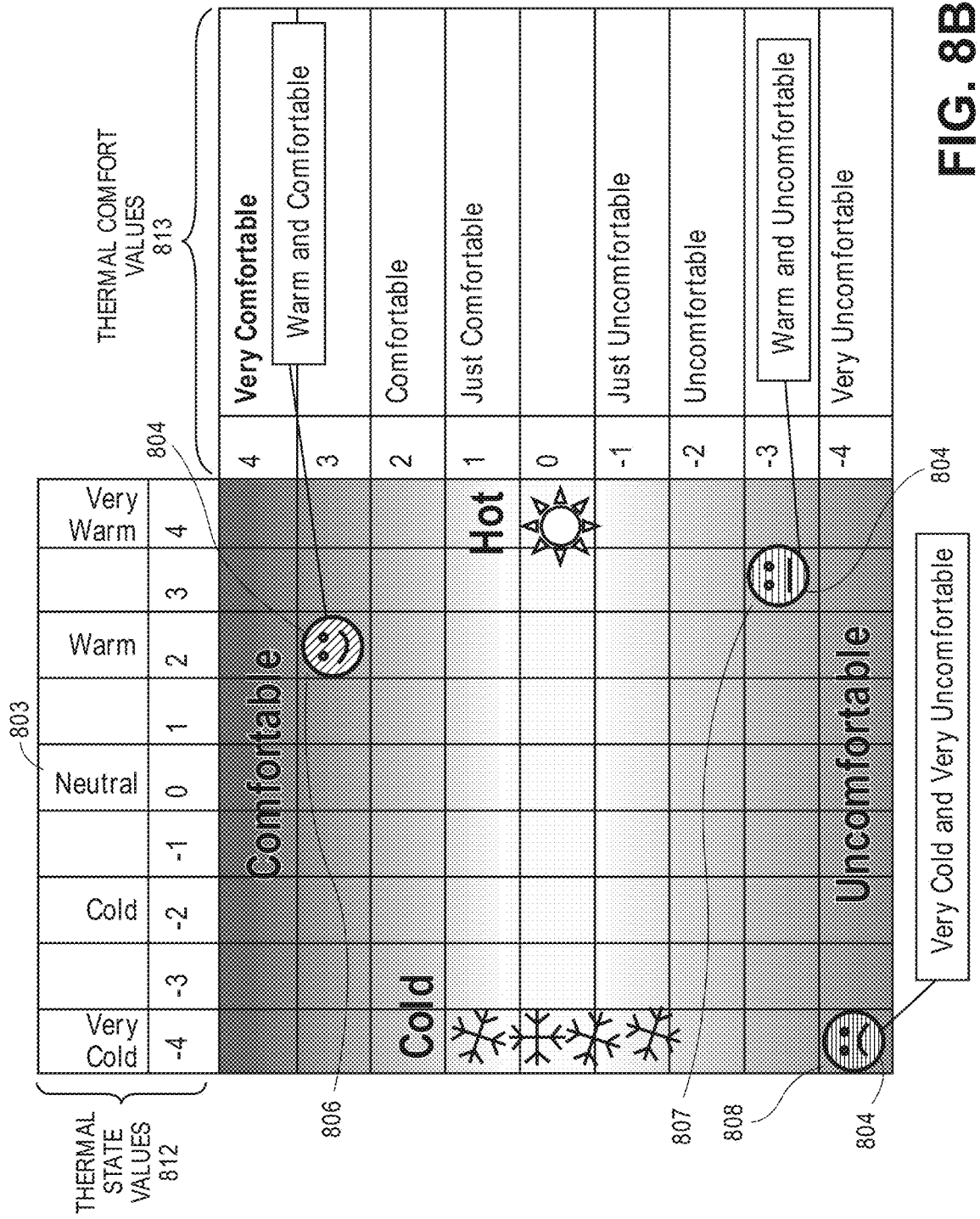
Figure 9D:
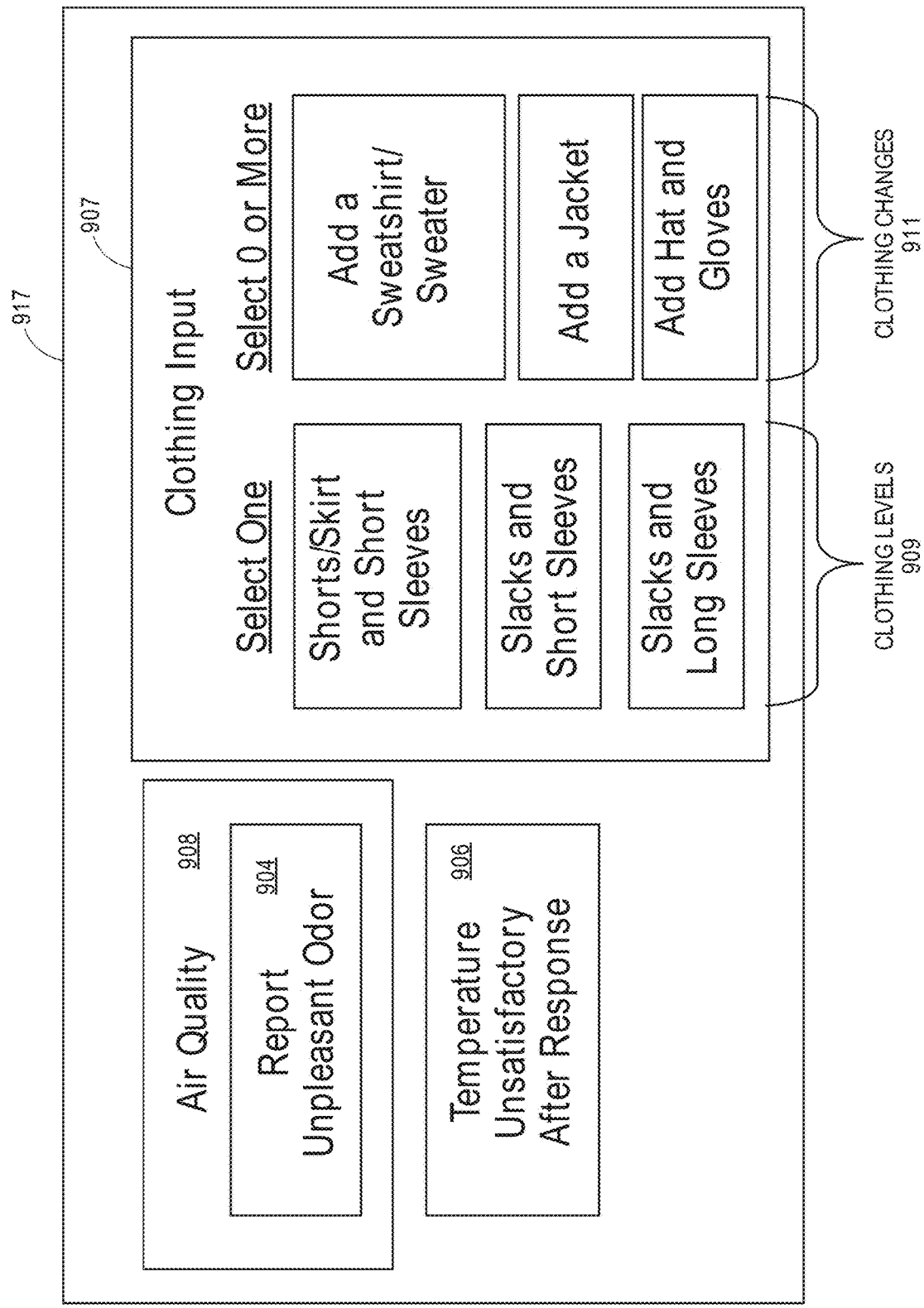

FIGS. 8A and 8B illustrate example user interface screens having more granular user interface controls. As depicted, mobile device 801 includes user interface screen 802. A user can move icon 804 in two or more dimensions (up/down and right/left) on user interface screen 702A. For example, the user can move (drag) icon 804 left to indicate a thermal state of increasing coolness and can move (drag) icon 804 right to indicate a thermal state of increasing warmth. The user can also move (drag) icon 804 up to indicate increasing thermal comfort and can move (drag) icon 804 down to indicate increasing thermal discomfort.

User interface screen 803 depicts a range of thermal state values 812 from −4 (very cold) to 4 (very hot) and a range of thermal comfort values 813 from −4 (very uncomfortable) to 4 (very comfortable). A user can move icon 804 to indicate both a thermal state and a thermal comfort. For example, a user can move icon 804 to position 806 (thermal state=2 and thermal comfort=3) to indicate that the user is warm and comfortable. The user can move icon 804 to position 807 (thermal state=3 and thermal comfort=−3) to indicate that the user is warm and uncomfortable. The user can move icon 804 to position 808 (thermal state=−4 and thermal comfort=−4 to indicate that the user is very cold and very uncomfortable. Mobile device 801 can render icon 804 to match an indicated thermal comfort as icon 804 is moved.

User interface screens 802 and 803 let users separate the feeling of hot and cold from being comfortable and uncomfortable. Mobile device 801 can send a thermal state and a thermal comfort selected through user interface screen 802 and/or through user interface screen 803 to a climate control system controller (e.g., 204, 504, 604, etc.).

FIGS. 9A-9D illustrate example user interface screens having even more granular user interface controls. User interface screen 901 depicts a selectable a range of thermal state values 912 from −4 (very cold) to 4 (very hot) and a selectable range of thermal comfort values 913 from −4 (very uncomfortable) to 4 (very comfortable). User interface screen 902 depicts a selectable range of moisture rating values 914 from −4 (too dry) to 4 (too humid). User interface screen 903 depicts a selectable range of airflow request values 916 from −4 (less airflow) to 4 (more airflow).

User interface screen 917 includes air quality 908, clothing input 907, and temperature unsatisfactory 906. Air quality 908 further includes report unpleasant odor 904. Clothing input 907 includes options for indicating clothing levels 909 and clothing changes 911. A user can select report unpleasant order 904 to report an unpleasant order to a climate control system controller. In response, the client control system controller can introduce a perfume or other scent into the air or engage a filtration/odor mitigation system. A user can select temperature unsatisfactory 906 to indicate to a client control system controller that a recent climate change was unsatisfactory. In response, the client control system controller can compute another climate change.

User interface screens 901, 902, 903, and 917 can be rendered at a mobile device. Users can interact with user interface screens 901, 902, 903, and 917 to individually select values for various climate related data. A mobile device can send values selected through any of user interface screens 901, 903, 903, and 917 to a climate control system controller (e.g., 204, 504, 604, etc.).

In some aspects, climate related data is sent anonymously form an occupant mobile device to a driver or front passenger mobile device. In response to receiving the climate related data, the driver or front passenger can manually reconfigure climate control components to implement a climate change.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, ride requests, queries, area assignments, thermal states, thermo-physiological models, component configurations, component configuration alterations, climate preconditioning, climate changes, user input, thermal comfort, moisture ratings, airflow requests, physiological data, clothing levels, clothing changes, air quality data, climate change responses, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, ride requests, queries, area assignments, thermal states, thermo-physiological models, component configurations, component configuration alterations, climate preconditioning, climate changes, user input, thermal comfort, moisture ratings, airflow requests, physiological data, clothing levels, clothing changes, air quality data, climate change responses, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

Example embodiments may include any one or more of the following:

Example 1 may include a method of adjusting a vehicle climate comprising: receiving, by one or more computer processors coupled to memory, a first communication from a mobile device indicating a first thermal state of a first person in a first area of a vehicle; determining a configuration of a climate control component that at least partially controls climate in the first area of the vehicle; determining a first climate change operation based at least in part on the first thermal state and the configuration of the climate control component; and causing the climate control component to implement the first climate change operation for the first area of the vehicle.

Example 2 may include the method of example 1 and/or some other example herein, further comprising: receiving a second communication indicating a second thermal state of a second person that is outside of the vehicle; determining a preconditioning climate change operation based at least in part on the second thermal state; and causing the climate control component to implement the preconditioning climate change operation for a second area of the vehicle.

Example 3 may include the method of example 1 and/or some other example herein, further comprising: receiving a second communication from the mobile device indicating a thermal comfort of the person; wherein determining the first climate change operation based at least in part on the first thermal state and the configuration of the climate control component comprises determining the first climate change operation based at least in part on the first thermal state, the thermal comfort, and the configuration of the climate control component.

Example 4 may include the method of example 1 and/or some other example herein, wherein determining the configuration of the climate control component that at least partially controls climate in the first area of the vehicle comprises determining the configuration of: a fan, a vent, a shade, a heater core valve, a heater core door, an air conditioner, a thermoelectric cooler, or a heating element.

Example 5 may include the method of example 1 and/or some other example herein, wherein causing the climate control component to implement the first climate change operation for the first area of the vehicle comprises causing the climate control component to alter the configuration of: a fan, a vent, a shade, a heater core valve, a heater core door, an air conditioner, a thermoelectric cooler, or a heating element.

Example 6 may include the method of example 1 and/or some other example herein, further comprising detecting the mobile device in the first area of the vehicle.

Example 7 may include the method of example 6 and/or some other example herein, wherein detecting the mobile device in the first area of the vehicle comprises detecting the mobile device based at least in part on one or more of: receiving wireless communication from the mobile device, receiving an indication that the mobile device scanned a QR code, detecting a Near Field Communication (NFC) tap between the mobile device and a vehicle component, detecting the mobile device connected to a Universal Service Bus (USB) port in the vehicle, via facial recognition with a visual or IR sensor, through an occupant classification system.

Example 8 may include the method of example 1 and/or some other example herein, further comprising: receiving a second communication from another mobile device indicating a second thermal state of a second person in the first area; wherein determining the first climate change operation based at least in part on the first thermal state and the configuration of the climate control component comprises determining the first climate change operation based at least in part on the first thermal state, the second thermal state, and the configuration of the climate control component.

Example 9 may include a method comprising: receiving, by one or more computer processors coupled to memory, a first communication from a mobile device indicating a vehicle occupant's thermal state and thermal comfort in an area of a vehicle cabin; determining a configuration of one or more components of a climate control system that at least partially controls climate in the area; determining a climate change operation based at least in part on the vehicle occupant's thermal state and thermal comfort, and the configuration of the one or more components; and causing the one or more components to implement the climate change operation.

Example 10 may include the method of example 9 and/or some other example herein, further comprising: receiving a second communication from another mobile device indicating another vehicle occupant's thermal state and thermal comfort in the area; wherein determining the climate change operation based at least in part on the vehicle occupant's thermal state and thermal comfort, and the configuration of the one or more components comprises determining the climate change operation based at least in part on the vehicle occupant's thermal state and thermal comfort, the other vehicle occupant's thermal state and thermal comfort, and the configuration of the one or more components.

Example 11 may include the method of example 9 and/or some other example herein, further comprising: querying, prior to the vehicle occupant entering the vehicle, the mobile device for the thermal state and the thermal comfort of the vehicle occupant; and preconditioning the climate in the area based on the thermal state and the thermal comfort of the vehicle occupant.

Example 12 may include the method of example 9 and/or some other example herein, wherein receiving the first communication from the mobile device further comprises receiving a moisture rating from the mobile device; and wherein determining the climate change operation based at least in part on the vehicle occupant's thermal state and thermal comfort, and the configuration of the one or more components comprises determining the climate change operation based at least in part on the vehicle occupant's thermal state and thermal comfort, the moisture rating, and the configuration of the one or more components.

Example 13 may include the method of example 9 and/or some other example herein, wherein receiving the first communication from the mobile device further comprises receiving an airflow control request; wherein determining the climate change operation based at least in part on the vehicle occupant's thermal state and thermal comfort, and the configuration of the one or more components comprises determining the climate change operation based at least in part on the vehicle occupant's thermal state and thermal comfort, the airflow control request, and the configuration of the one or more components; and wherein causing the one or more components to implement the climate change operation comprises causing the one or more components to alter the speed of a fan.

Example 14 may include the method of example 9 and/or some other example herein, further comprising: generating a communication link to an application at the mobile device; determining physiological data of the vehicle occupant using the application; and wherein determining the climate change operation based at least in part on the vehicle occupant's thermal state and thermal comfort, and the configuration of the one or more components comprises determining the climate change operation based at least in part on the vehicle occupant's thermal state and thermal comfort, the physiological data, and the configuration of the one or more components.

Example 15 may include the method of example 9 and/or some other example herein, further comprising calculating a comfort of the vehicle occupant based at least in part on the thermal state, the thermal comfort, and the configuration of one or more components in accordance with an occupant comfort model.

Example 16 may include the method of example 15 and/or some other example herein, wherein calculating the comfort of the vehicle occupant in accordance with an occupant comfort module comprises calculating the comfort of the vehicle occupant in accordance with an occupant comfort model selected from among: a thermo-physiological model, a control algorithm, or a lookup table.

Example 17 may include a vehicle comprising: a climate control system including a plurality of climate control components controlling the climate in a plurality of zones within a cabin of the vehicle; at least one processor; and system memory coupled to the at least one processor and storing instructions configured to cause the processor to: receive communication from a mobile device indicating a vehicle occupant's thermal state and thermal comfort in a first zone of the plurality of zones; determine a configuration of a first subset of climate control components of the plurality of climate control components, where the first subset at least partially controls climate in the first zone; determine a climate change operation based at least in part on the vehicle occupant's thermal state and thermal comfort, and the configuration of the first subset of climate control components; and cause the configuration of the first subset of climate control components to be altered to implement the climate change in the first zone.

Example 18 may include the vehicle of example 17 and/or some other example herein, further comprising instructions configured to cause the processor to receive communication from another mobile device indicating another vehicle occupant's thermal state and thermal comfort in the first zone; and wherein instructions configured to cause the processor to determine a climate change operation comprise instructions configured to cause the processor to compute the climate change based at least in part on the other vehicle occupant's thermal state and thermal comfort.

Example 19 may include the vehicle of example 17 and/or some other example herein, further comprising instructions configured to cause the processor to: receive communication from another mobile device indicating another vehicle occupant's thermal state and thermal comfort in a second zone from among the plurality of zones; determine a configuration of a second subset of climate control components of the plurality of climate control components, wherein the second subset at least partially controls climate in the second zone; determine a climate change based at least in part on the other vehicle occupant's thermal state and thermal comfort and the configuration of the second subset of climate control components; and cause the configuration of the second subset of climate control components to be altered to implement the climate change in the second zone.

Example 20 may include the vehicle of example 17 and/or some other example herein, wherein instructions configured to cause the processor to compute a climate change comprise instructions configured to cause the processor to compute a change to one or more of: temperature, humidity, air velocity, air flow direction, or air quality in the first zone.

What is claimed:

1. A method of adjusting a vehicle climate comprising:
receiving, by one or more computer processors coupled to memory, a first communication from a mobile device indicating a first thermal state of a first person in a first area of a vehicle;
determining a configuration of a climate control component that at least partially controls climate in the first area of the vehicle;
determining a first climate change operation based at least in part on the first thermal state and the configuration of the climate control component; and
causing the climate control component to implement the first climate change operation for the first area of the vehicle;
receiving a second communication indicating a second thermal state of a second person that is outside of the vehicle;
determining a seat assignment in the vehicle for the second person before the second person enters the vehicle;
determining a preconditioning climate change operation based at least in part on the second thermal state; and
causing the climate control component to implement the preconditioning climate change operation for a second area of the vehicle at the location of the seat assignment for the second person.

2. The method of claim 1, further comprising:
receiving a second communication from the mobile device indicating a thermal comfort of the person, wherein determining the first climate change operation based at least in part on the first thermal state and the configuration of the climate control component comprises determining the first climate change operation based at least in part on the first thermal state, the thermal comfort, and the configuration of the climate control component.

3. The method of claim 1, wherein determining the configuration of the climate control component that at least partially controls climate in the first area of the vehicle comprises determining the configuration of: a fan, a vent, a shade, a heater core valve, a heater core door, an air conditioner, a thermoelectric cooler, or a heating element.

4. The method of claim 1, wherein causing the climate control component to implement the first climate change operation for the first area of the vehicle comprises causing the climate control component to alter the configuration of: a fan, a vent, a shade, a heater core valve, a heater core door, an air conditioner, a thermoelectric cooler, or a heating element.

5. The method of claim 1, further comprising detecting the mobile device in the first area of the vehicle.

6. The method of claim 5, wherein detecting the mobile device in the first area of the vehicle comprises detecting the mobile device based at least in part on one or more of: receiving wireless communication from the mobile device, receiving an indication that the mobile device scanned a QR code, detecting a Near Field Communication (NFC) tap between the mobile device and a vehicle component, detecting the mobile device connected to a Universal Service Bus (USB) port in the vehicle, via facial recognition with a visual or IR sensor, through an occupant classification system.

7. The method of claim 1, further comprising:
receiving a second communication from another mobile device indicating a second thermal state of a second person in the first area wherein determining the first climate change operation based at least in part on the first thermal state and the configuration of the climate control component comprises determining the first climate change operation based at least in part on the first thermal state, the second thermal state, and the configuration of the climate control component.

8. A method comprising:
receiving, by one or more computer processors coupled to memory, a first communication from a mobile device including an indication made by a vehicle occupant of a thermal state and a thermal comfort of the vehicle occupant in an area of a vehicle cabin, wherein the thermal comfort is different than the thermal state and indicates a comfort level of the vehicle occupant in the thermal state;

determining a configuration of one or more components of a climate control system that at least partially controls climate in the area;

determining a climate change operation based at least in part on the vehicle occupant's thermal state and thermal comfort, and the configuration of the one or more components; and causing the one or more components to implement the climate change operation.

9. The method of claim 8, further comprising:

receiving a second communication from another mobile device indicating another vehicle occupant's thermal state and thermal comfort in the area, wherein determining the climate change operation based at least in part on the vehicle occupant's thermal state and thermal comfort, and the configuration of the one or more components comprises determining the climate change operation based at least in part on the vehicle occupant's thermal state and thermal comfort, the other vehicle occupant's thermal state and thermal comfort, and the configuration of the one or more components.

10. The method of claim 8, further comprising:

querying, prior to the vehicle occupant entering the vehicle, the mobile device for the thermal state and the thermal comfort of the vehicle occupant; and preconditioning the climate in the area based on the thermal state and the thermal comfort of the vehicle occupant.

11. The method of claim 8, wherein receiving the first communication from the mobile device further comprises receiving a moisture rating from the mobile device; and wherein determining the climate change operation based at least in part on the vehicle occupant's thermal state and thermal comfort, and the configuration of the one or more components comprises determining the climate change operation based at least in part on the vehicle occupant's thermal state and thermal comfort, the moisture rating, and the configuration of the one or more components.

12. The method of claim 8, wherein receiving the first communication from the mobile device further comprises receiving an airflow control request;

wherein determining the climate change operation based at least in part on the vehicle occupant's thermal state and thermal comfort, and the configuration of the one or more components comprises determining the climate change operation based at least in part on the vehicle occupant's thermal state and thermal comfort, the airflow control request, and the configuration of the one or more components; and wherein causing the one or more components to implement the climate change operation comprises causing the one or more components to alter the speed of a fan.

13. The method of claim 8, further comprising:

generating a communication link to an application at the mobile device;

determining physiological data of the vehicle occupant using the application; and wherein determining the climate change operation based at least in part on the vehicle occupant's thermal state and thermal comfort, and the configuration of the one or more components comprises determining the climate change operation based at least in part on the vehicle occupant's thermal state and thermal comfort, the physiological data, and the configuration of the one or more components.

14. The method of claim 8, further comprising calculating a comfort of the vehicle occupant based at least in part on the thermal state, the thermal comfort, and the configuration of one or more components in accordance with an occupant comfort model.

15. The method of claim 14, wherein calculating the comfort of the vehicle occupant in accordance with an occupant comfort model comprises calculating the comfort of the vehicle occupant in accordance with an occupant comfort model selected from among: a thermo-physiological model, a control algorithm, or a lookup table.

16. A vehicle comprising:

a climate control system including a plurality of climate control components controlling the climate in a plurality of zones within a cabin of the vehicle;

at least one processor; and system memory coupled to the at least one processor and storing instructions configured to cause the processor to:

receive communication from a mobile device including an indication made by a vehicle occupant of a thermal state and a thermal comfort of the vehicle occupant in a first zone of the plurality of zones, wherein the thermal comfort is different than the thermal state and indicates a comfort level of the vehicle occupant in the thermal state;

determine a configuration of a first subset of climate control components of the plurality of climate control components, where the first subset at least partially controls climate in the first zone;

determine a climate change operation based at least in part on the vehicle occupant's thermal state and thermal comfort, and the configuration of the first subset of climate control components; and cause the configuration of the first subset of climate control components to be altered to implement the climate change in the first zone.

17. The vehicle of claim 16, further comprising instructions configured to cause the processor to receive communication from another mobile device indicating another vehicle occupant's thermal state and thermal comfort in the first zone; and wherein instructions configured to cause the processor to determine a climate change operation comprise instructions configured to cause the processor to compute the climate change based at least in part on the other vehicle occupant's thermal state and thermal comfort.

18. The vehicle of claim 16, further comprising instructions configured to cause the processor to:

receive communication from another mobile device indicating another vehicle occupant's thermal state and thermal comfort in a second zone from among the plurality of zones;

determine a configuration of a second subset of climate control components of the plurality of climate control components, wherein the second subset at least partially controls climate in the second zone;

determine a climate change based at least in part on the other vehicle occupant's thermal state and thermal comfort and the configuration of the second subset of climate control components; and cause the configuration of the second subset of climate control components to be altered to implement the climate change in the second zone.

19. The vehicle of claim 16, wherein instructions configured to cause the processor to compute a climate change comprise instructions configured to cause the processor to compute a change to one or more of: temperature, humidity, air velocity, air flow direction, or air quality in the first zone.

\* \* \* \* \*